Feb. 22, 1966     H. K. GRAVES     3,236,138
SOUNDING BOARD FOR STRINGED MUSICAL INSTRUMENT
Filed July 22, 1963     5 Sheets-Sheet 1
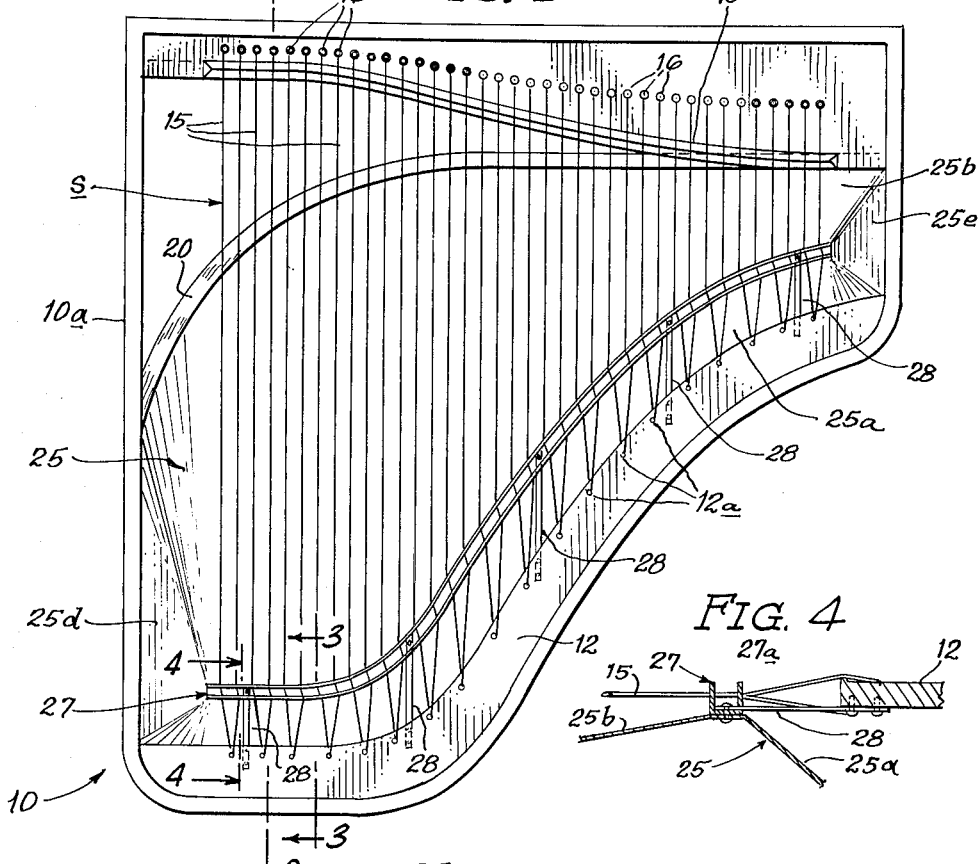
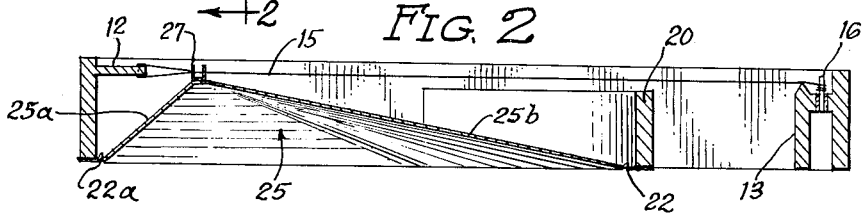
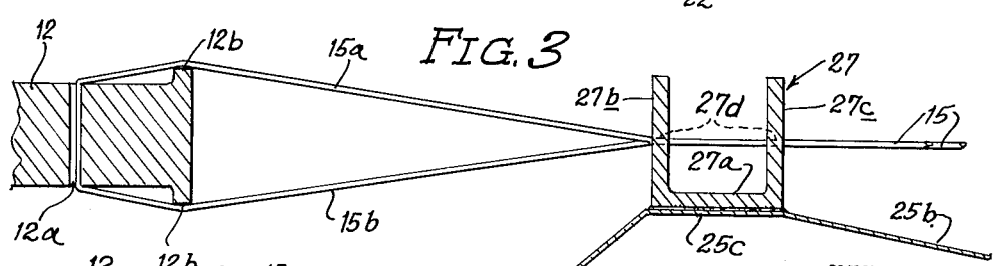
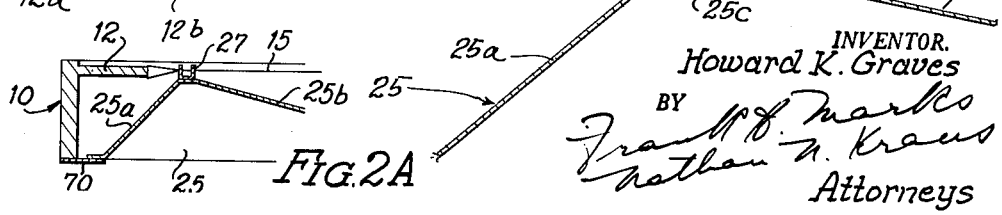
INVENTOR.
Howard K. Graves
BY
Frank F. Markes
Nathan N. Kraus
Attorneys

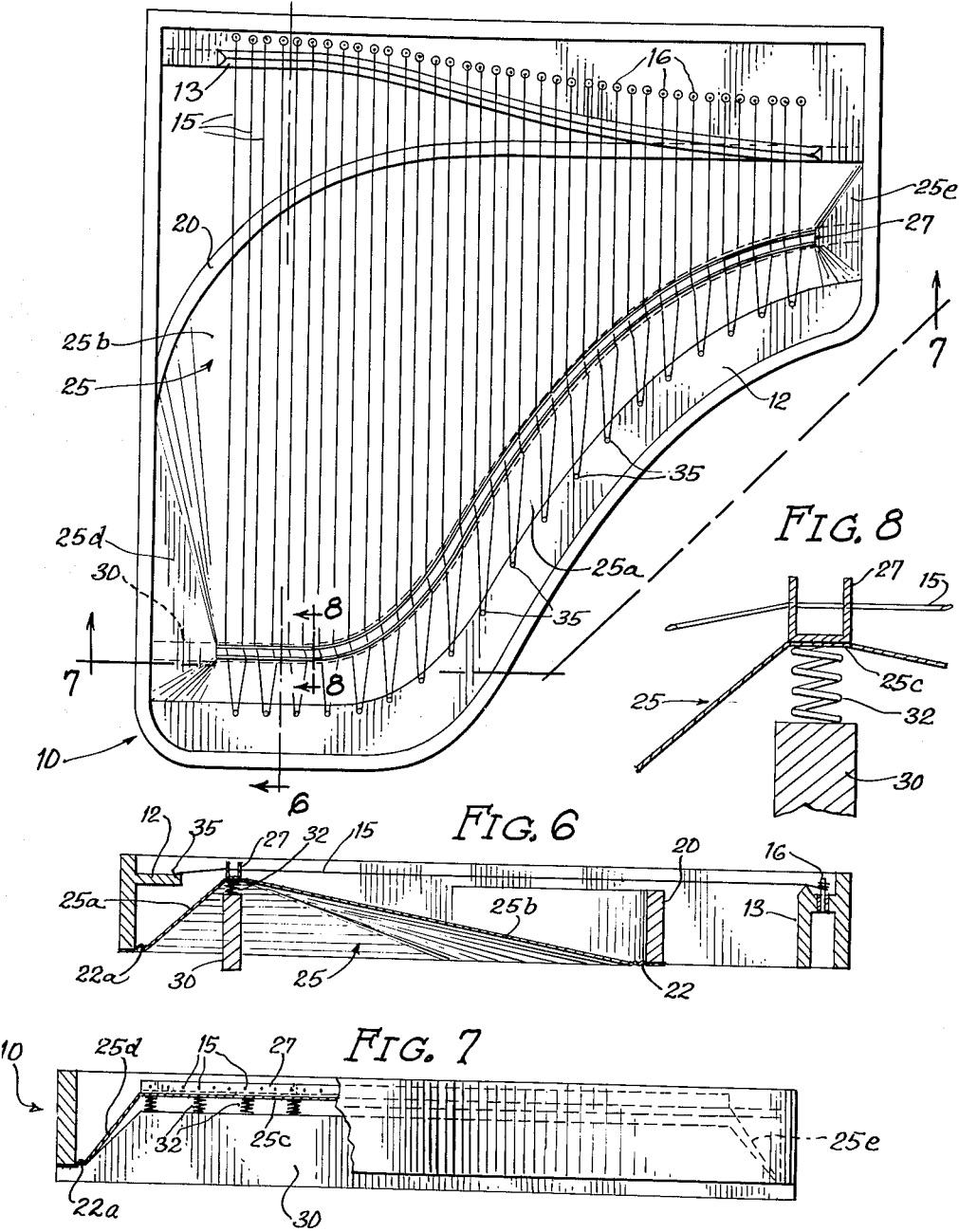

Feb. 22, 1966  H. K. GRAVES  3,236,138
SOUNDING BOARD FOR STRINGED MUSICAL INSTRUMENT
Filed July 22, 1963  5 Sheets-Sheet 3
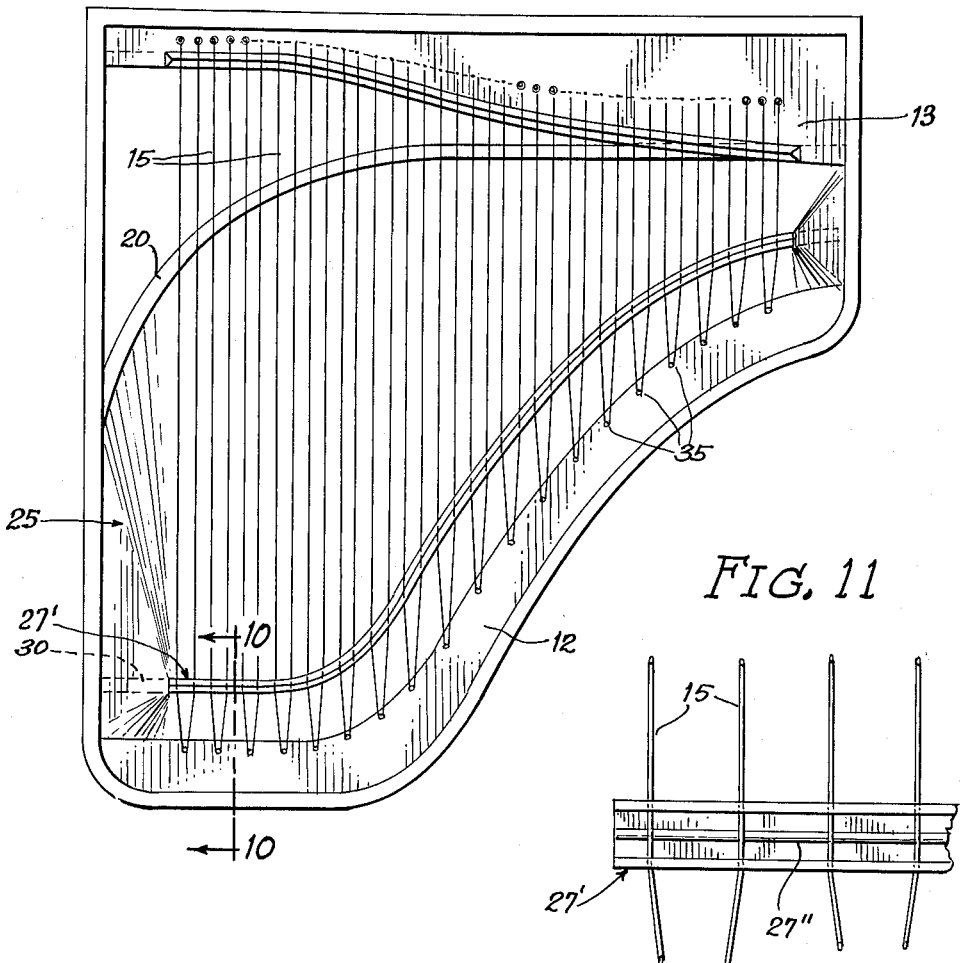
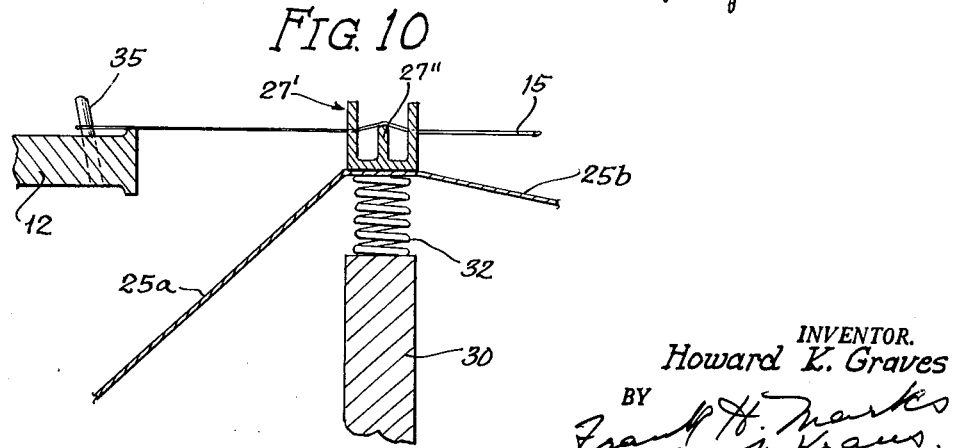
INVENTOR.
Howard K. Graves
BY
Frank H. Marks
Nathan N. Kraus,
Attorneys Feb. 22, 1966   H. K. GRAVES   3,236,138
SOUNDING BOARD FOR STRINGED MUSICAL INSTRUMENT
Filed July 22, 1963   5 Sheets-Sheet 4
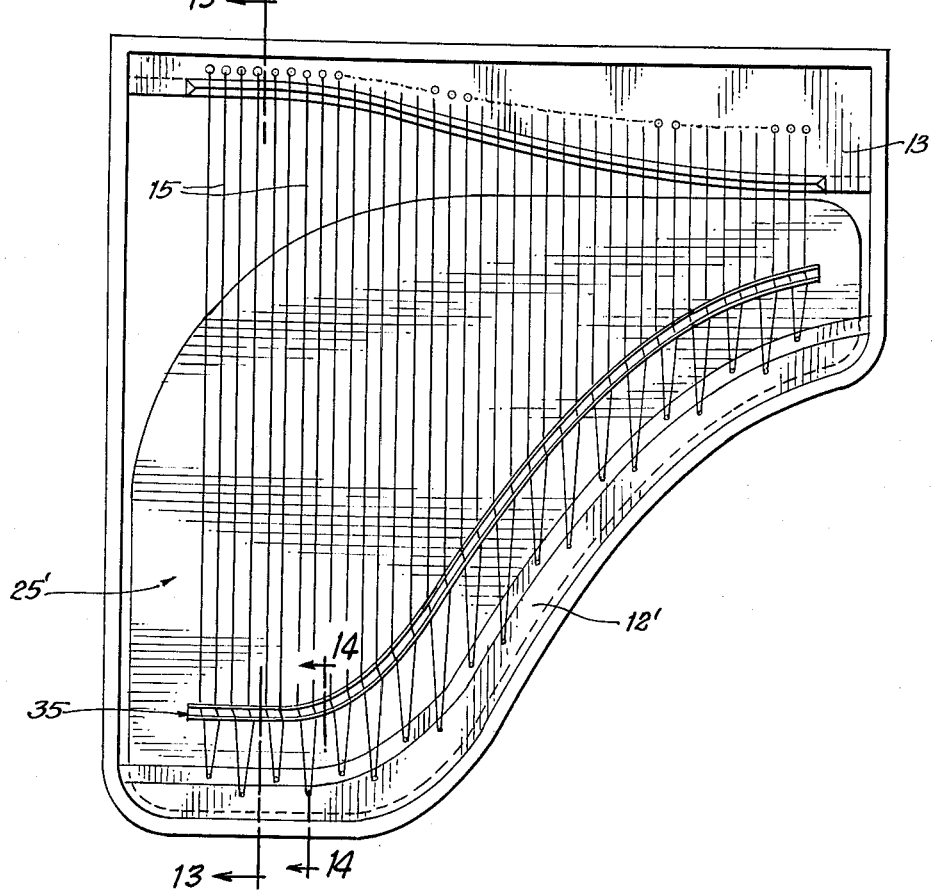
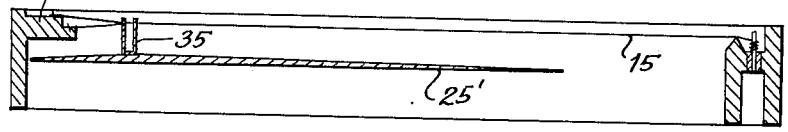
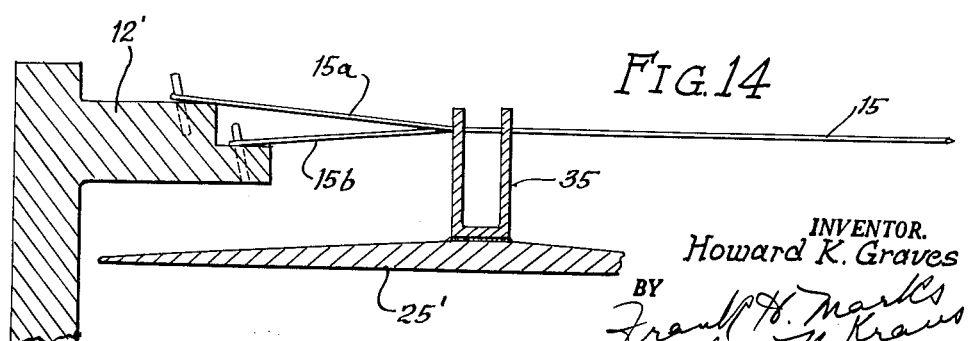
INVENTOR.
Howard K. Graves
BY
Frank H. Marks
Nathan N. Kraus
Attorneys Feb. 22, 1966   H. K. GRAVES   3,236,138
SOUNDING BOARD FOR STRINGED MUSICAL INSTRUMENT
Filed July 22, 1963   5 Sheets-Sheet 5
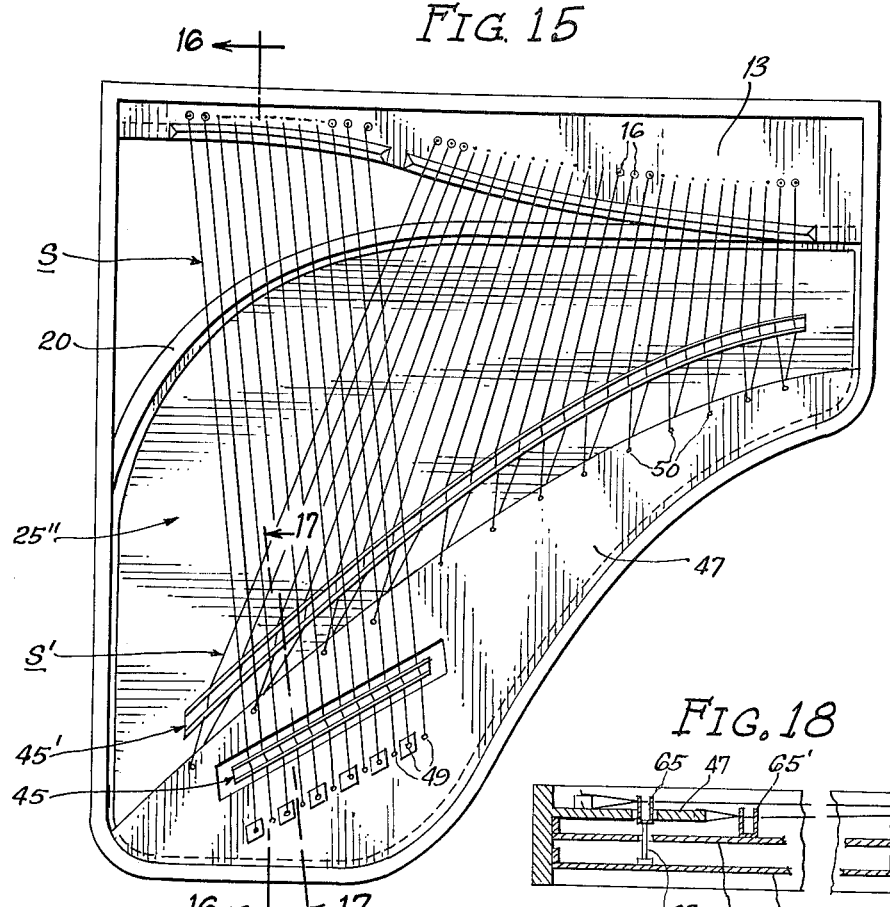
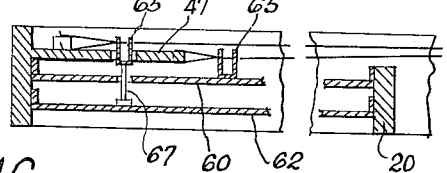
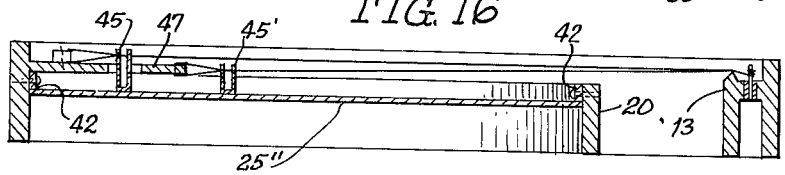
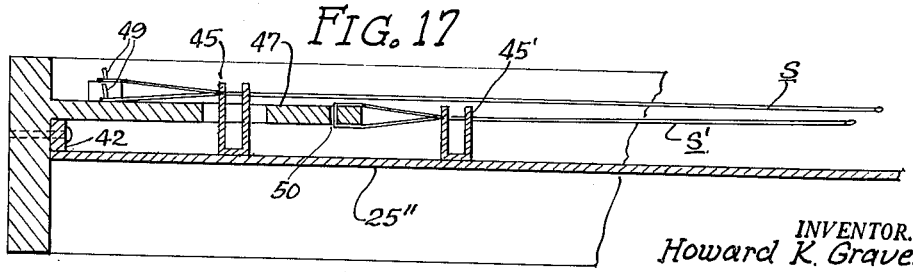
INVENTOR.
Howard K. Graves
BY
Attorneys

# United States Patent Office 3,236,138
Patented Feb. 22, 1966

3,236,138
SOUNDING BOARD FOR STRINGED MUSICAL
INSTRUMENT
Howard Kennedy Graves, 6550 Burton Drive,
Cleveland 42, Ohio
Filed July 22, 1963, Ser. No. 297,180
10 Claims. (Cl. 84—192)

The present invention relates to sounding boards for stringed musical instruments, and more particularly to a sounding board adapted for application to pianos. This application is a continuation-in-part of my U.S. Patent application, Serial No. 49,602 now abandoned, filed August 15, 1960.

The sounding board of a piano radiates into the air the sound energy of the vibrating strings and is an acoustical coupling between the strings and the air. The sounding board is driven by the strings through a bridge that forms one of vibrational nodes of the strings.

The vibrating strings are supported at the bridge by a proper degree of acoustical stiffness to produce a pleasing tone. An insufficient degree of stiffness causes the sound to be too rapidly damped to be pleasing, and an excess degree of stiffness causes the sound to decay too slowly to produce an acceptable loud tone. The proper degree of stiffness is a function of the frequency and the tension of the string. Higher pitched strings require more stiffness than lower pitched strings, and higher tensioned strings require more stiffness than lower tensioned strings.

The acoustical stiffness at the bridge of pianos and harpischords is provided by the material stiffness of the sounding board. The sounding board thus functions as both a means of radiating sound and as a source of acoustical stiffness.

The primary object of my invention is to produce a musical instrument sounding board in which the means for radiating the sound and the means for providing the acoustical stiffness at the bridge are accomplished by different members.

Another object of my invention is to provide a sounding board which is solely a radiator of sound, and the stiffness at the bridge is provided by a means separate from the sounding board.

And still another object of my invention is to provide for separation of the sound radiator from the stiffness means so as to allow the sounding board to be designed as an efficient, responsive radiator of sound, and the stiffness to be optimum for each string.

In accordance with my invention, the acoustical stiffness at the bridge can be created by a downbearing of the strings against a stiff support, by a nonbearing coupling of the strings to a stiff support, or by a downbearing against an upbearing of alternate strings or groups of strings. The stiffness may vary along the length of the bridge so that the higher pitched strings are more stiffly supported than the lower pitch strings.

Further, the sounding board is a radiator of sound and does not substantially contribute to the acoustical stiffness at the bridge nor does it support a string load. The sounding board is secured to the bridge and at the periphery thereof can be compliantly mounted to the instrument case or frame, or it may be free floating with no direct contact with the case or frame. The sounding board may take a variety of shapes, for example, it can be a flat plate, or can be shaped like a modified cone with the apex extended into a line along the bridge. The sounding board can also be made from a variety of materials such as wood, plastic, or paper. Since the sounding board bears no string load, it can be made from a material that is rigid enough to radiate sound but not strong enough to support a load. Felted fiber, as used in lound speaker cones, makes an ideal sounding board because it will not crack or split with age.

The various methods of providing the acoustical stiffness at the bridge require a compatible frame and bridge. The use of counter bearing strings requires a frame and bridge capable of providing both upbearing and downbearing. The use of a stiff support requires a frame that is designed so that a stiffening means can be coupled between the frame and the bridge. The stiffening means along the bridge can be a series of individual stiffeners, or a continuous stiff member, and the bridge can be positively positioned relative to the frame by struts.

Numerous advantages are achieved by separating the radiating surface from the means of providing acoustical stiffness. The preferred embodiment of the sounding board employs a cone-like felted fiber surface that can be manufactured at a cost much less than that of conventional wooden sounding boards. A sounding board of felted fiber is sufficiently rigid in a cone-like shape to drive the air, and yet is light enough to respond to the higher harmonics of the vibrating strings. The resulting tone color is more clear and brilliant than that produced by a conventional piano.

Furthermore, the strings are not supported by the sounding board so that it will not lose its crown with a resulting degredation of tone quality. Because the bridge is not positioned by the sounding board, the latter cannot go in and out of tune with seasonal humidity changes. The separate means to stiffen the bridge permits the stiffness to be varied along the length of the bridge to achieve the most pleasing rate of tonal decay for the variously pitched strings.

Various other objects and advantages will suggest themselves to those skilled in the art by the description which follows.

Referring now to the drawings forming a part of this application and illustrating certain preferred embodiments of my invention.

FIG. 1 is a top plan view of a piano case or frame in which is mounted a sounding board embodying my invention;

FIG. 2 is a sectional view taken substantially along the line 2—2 of FIG. 1;

FIG. 2A is a partial sectional view showing another form of compliantly mounting a sounding board;

FIG. 3 is an enlarged fragmentary detailed section of a portion of FIG. 2, as indicated by the line 3—3 of FIG. 1;

FIG. 4 is an enlarged detailed section taken substantially along line 4—4 of FIG. 1;

FIG. 5 is a plan view similar to FIG. 1 of a modified form of my invention;

FIG. 6 is a sectional view taken substantially along the line 6—6 of FIG. 5;

FIG. 7 is a fragmentary section-elevation taken substantially along the line 7—7 of FIG. 5;

FIG. 8 is an enlarged detailed section taken substantially along the line 8—8 of FIG. 5;

FIG. 9 is a plan view of still another embodiment of my invention;

FIG. 10 is a fragmentary enlarged detailed section taken substantially along the line 10—10 of FIG. 9;

FIG. 11 is a fragmentary plan view from the top of FIG. 9;

FIG. 12 is a plan view of still another embodiment of my invention;

FIG. 13 is a sectional view taken substantially along the line 13—13 of FIG. 12;

FIG. 14 is an enlarged detailed section taken substantially along the line 14—14 of FIG. 12;

FIG. 15 is a plan view of still another embodiment of my invention;

FIG. 16 is a sectional view taken along the line 16—16 of FIG. 15;

FIG. 17 is an enlarged detailed section taken substantially along the line 17—17 of FIG. 15; and FIG. 18 is a partial sectional view, on a reduced scale, of another embodiment.

Referring first to the embodiment of the invention shown in FIGS. 1–4, numeral 10 indicates a piano frame as employed in a piano of the grand type. It will be readily understood, of course, that my invention is equally applicable to any other type of piano, such as a standard upright, console type, etc. Carried by the frame is the usual complement of strings indicated in general by the letter S, and made up of a plurality of individual strings 15. The strings may be attached to suitable supporting elements carried by the frame 10, such as a hitch support 12 on one side of the frame and a bridge support 13 on the opposite side of the frame 10. As seen best in FIG. 3, the hitch support 12 is bored as at 12a to permit passage of the strings and has oppositely extending bearing bosses 12b to seat the strings. Tuning pins 16 seated in suitable bushings in the bridge support 13 secure the ends of the strings 15. A sounding board support beam 20 is attached at one end to a side member 10a of the frame 10 and at the other end is connected to the bridge support 13, as seen best in FIG. 1.

The sounding board 25 is mounted to the bottom rim of frame 10 and support beam 20. The corrugations 22a and 22 extend around the periphery of sounding board 25 to provide a compliant mounting between the sounding board and the frame.

The compliant mounting between the sounding board and the frame can also be accomplished as shown in FIG. 2a. The periphery of sounding board 25 is secured as with glue, to a ring 70 of a compliant material such as cloth, which is secured as with glue to frame 10 and support beam 20.

The sounding board, in accordance with my invention, is preferably molded of a suitable fibrous material such as paper, papier mache, or the like, and is open at the bottom, sides 25a and 25b being tapered as seen best in FIG. 2 to a vertex or ridge 25c underlying a bridge member 27. The sounding board 25 also has sides 25d and 25e (FIG. 1), so that this element can be said to be shaped like a modified cone with its apex extended into a line along the bridge member 27.

Bridge member 27, preferably of channel formation, can be of a suitable plastic material and formed by extrusion, molding or a similar process, or of a lightweight metal, such as aluminum or magnesium. Bridge member 27 is positioned relative to the frame 10 by a plurality of spaced struts 28 (FIG. 4), one end of which extends through slots in a side wall of bridge member 27 and is attached to the web portion 27a thereof, as by rivets or the like, while the other end of each strut 28 is secured, as by screws or the like, to the hitch support 12.

Web portion 27a of bridge member 27 has its outer face secured to the vertex or ridge 25c of the sounding board 25 by means of a suitable cement, the legs 27b and 27c being provided with suitable holes 27d for passage of the strings 15a and 15b.

It will be noted that alternate strings 15a and 15b extend upwardly and downwardly, respectively, from bridge member 27 and are thence threaded through suitable holes in the hitch support 12, thus provided upbearing and downbearing forces relative to the sounding board 25. The major advantage of such a stringing arrangement is that the necessary acoustical stiffness is attained by the material stiffness of the strings without the need of any external stiffening means.

It will be seen that I have provided in this embodiment a sounding board of generally conical shape with a ridge extending along the vertex thereof which is adhesively secured to the bridge member 27 through which the vibratory forces of the strings are transmitted to the sounding board 25.

Referring now to the embodiment of my invention shown in FIGS. 5–8, the construction is substantially the same as that of the embodiment just described above, except in the following respects. In this case I provide a bridge supporting beam 30 attached at its opposite ends to frame 10 and underlying the full length of bridge 27. Spaced along the upper edge of beam 30 is a plurality of helical spring members 32 which are normally under compression, the upper ends of the coils bearing against the inner surface of the vertex portion 25c of the sounding board 25. In this case the stringing is somewhat different from that of the embodiment described above. Each of strings 15 is secured at one end to a tuning pin 16, as before, and the other end is attached to a hitch pin 35 carried by the hitch support 12. In this case it will be noted that all of the acoustical stiffness is created by springs 32 and the downbearing of strings 15.

Referring now to the embodiment of my invention shown in FIGS. 9–11, the arrangement in this case is substantially similar to that of FIGS. 5–8 with the following exceptions. In this case I employ a modified form of bridge member 27' which is a channel having an upstanding flange 27" parallel to and disposed intermediate the legs of the channel. It will be seen in FIG. 9 that the strings 15 extend over flange 27" of the bridge, in order to provide firm string contact with the bridge.

In this case while I use a plurality of helical springs 32', as in the last described embodiment, the springs in this case are in a normally unloaded condition rather than under compression as in the other case.

Referring now to the embodiment of my invention shown in FIGS. 12–14, a modified form of sounding board is represented by the numeral 25' which is essentially planar in conformation rather than pyramidal and, as in the embodiments described above, is preferably formed of wood, plastic, or other suitable material, and can be somewhat tapered in thickness, as seen in FIGS. 13 and 14, with a maximum thickness immediately under bridge member 35, which in this case can be a channel of somewhat greater depth than in the other embodiments. The bridge member 35 as before, can be secured to the sounding board 25' by a suitable cement or adhesive. As in the embodiment first described, FIGS. 1–4, the strings 15a and 15b are alternately arranged to exert upbearing and downbearing forces, respectively, on the bridge member 35. It will be seen that in this case the hitch support 12' is formed to provide two steps or levels for the attachment of alternate strings 15a and 15b, as by means of pegs 73, as seen best in FIG. 14.

The sounding board 25' is supported only at the bridge, being free around its entire periphery. Although shown in generally planar form, it may be of other conformation, such as pyramidal, having a ridge portion which joins it to the bridge member 35.

Referring now to the embodiment of my invention shown in FIGS. 15–18, a sounding board 25", generally resembling sounding board 25', is substantially planar in configuration and is preferably formed of wood or a relatively stiff material. The ends of sounding board 25" are secured by means of a suitable cement or adhesive to supporting bars 42, as seen best in FIG. 16, which are mounted on frame 10 and support beam 20.

In this case I provide cross-stringing S, S' (FIG. 1) the strings S extending through bridge member 45, the latter being secured to sound board 25". Bridge member 45 extends through a passage in hitch support 47 to which the strings are secured as at 49, alternate string providing up and downbearing on bridge 45. The string of the series S' extend through a second bridge member 45' which is likewise secured to sounding board 25" and these strings are threaded through openings in the hitch support 47, as indicated at 50, the strings of this series likewise providing alternate up and downbearing on bridge 45'.

It is believed that the operation of the last described embodiments will be readily apparent.

FIG. 18 shows an application of my invention to an instrument, such as a piano, utilizing a plurality of bridges 65 and 65' as in the embodiment of FIGS. 15-17 but with separate sounding boards 60 and 62 for each bridge. Bridge 65' is fixed, as by cement, to board 60, while bridge 65 extends through a passage in board 60 and is connected to sounding board 62 by any suitable rigid means, such as a plurality of spaced rods 67.

It will be seen that I have provided a piano in which the sound radiating member and the means for providing the acoustical stiffness to the bridge member contact are separate. In certain embodiments the sounding board is compliantly mounted to the frame, while in others, it is completely free-floating. In certain embodiments the acoustical stiffness at the bridge member is provided by a stiffening member, while in others, it is provided by the counter bearing of the strings themselves.

Although I have disclosed my invention as applied to a piano, it will be apparent to one skilled in the art that my invention may be applicable to other types of stringed musical instruments.

Various other changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. A stringed musical instrument comprising:
   a frame;
   a plurality of strings tensionally supported by said frame;
   bridge means coupled to said strings;
   sound radiator means coupled to said bridge means and compliantly coupled to said frame; and
   stiffening means coupled between said bridge means and said frame;
   whereby acoustical stiffness at said bridge means is produced by said stiffening means.

2. A stringed musical instrument in accordance with claim 1 wherein the periphery of said sound radiator means is secured to a compliant member and the latter is mounted on said frame.

3. A stringed musical instrument in accordance with claim 1 wherein the periphery of said sound radiator means is secured to a plurality of compliant members and the latter are mounted on said frame.

4. A stringed musical instrument in accordance with claim 1 wherein said sound radiator means is shaped like a modified cone having an apex extending along the length of said bridge means.

5. A stringed musical instrument in accordance with claim 1 wherein said sound radiator means comprises a felted fibrous material having a modified conical shape with an apex extending the length of said bridge means.

6. A stringed musical instrument in accordance with claim 4 wherein the periphery of said modified conical shape is provided with a plurality of corrugations for compliantly coupling said sound radiator means to said frame.

7. A stringed musical instrument in accordance with claim 4 wherein the periphery of said modified conical shape is secured to a compliant fabric and the latter is mounted on said frame.

8. A stringed musical instrument in accordance with claim 1 wherein said stiffening means comprises a plurality of stiffening members.

9. A stringed musical instrument in accordance with claim 1 wherein said stiffening means comprises a plurality of springs.

10. A stringed musical instrument in accordance with claim 1 wherein said plurality of strings bear against said bridge means and said acoustical stiffness is produced by said strings and said stiffening means.

References Cited by the Examiner

UNITED STATES PATENTS

| | | | |
|---|---|---|---|
| 462,645 | 11/1891 | Weber | 84—192 |
| 983,125 | 1/1911 | Derdeyn | 84—192 |
| 1,779,288 | 10/1930 | Pohlman | 84—190 |
| 2,107,659 | 2/1938 | Bilhuber | 84—192 |
| 2,229,440 | 1/1941 | Carlisle | 84—192 |
| 2,760,398 | 8/1956 | Caspersen | 84—192 |

FOREIGN PATENTS 367,990  1/1923  Germany.

LEO SMILOW, *Primary Examiner.*